United States Patent [19]

Nelson

[11] Patent Number: 4,753,397

[45] Date of Patent: Jun. 28, 1988

[54] SPRING FASTENER FOR TAPE LEADER TO REEL HUB

[75] Inventor: Norman E. Nelson, Roseville, Minn.

[73] Assignee: Minnesota Mining and Manufacturing Company, St. Paul, Minn.

[21] Appl. No.: 476,061

[22] Filed: Mar. 17, 1983

[51] Int. Cl.⁴ ............................................. B65H 75/28
[52] U.S. Cl. .................................................. 242/74.1
[58] Field of Search .................... 242/74, 74.1, 74.2, 242/125, 125.1

[56] References Cited

U.S. PATENT DOCUMENTS 3,921,927  11/1975  Esashi et al. ........................... 242/74
4,300,729  11/1981  Oishi et al. ......................... 242/74.1
4,360,173  11/1982  Shoji ....................................... 242/74

FOREIGN PATENT DOCUMENTS 1959778  2/1967  Fed. Rep. of Germany.
3033883  4/1981  Fed. Rep. of Germany.
3037349  4/1981  Fed. Rep. of Germany.
3203919  9/1982  Fed. Rep. of Germany.

Primary Examiner—John M. Jillions
Attorney, Agent, or Firm—Donald M. Sell; James A. Smith; William L. Huebsch

[57] ABSTRACT

A tape leader is fastened to a reel hub by a spring clip fitting across a slot in the hub rim. The clip has a "J"-shaped portion which slides against a support in a camming action to force an end part of the portion against the leader and an inner surface of the rim. The sprung clip crosses the slot and is held in position at the other edge of the slot by a spring catch.

6 Claims, 1 Drawing Sheet

SPRING FASTENER FOR TAPE LEADER TO REEL HUB

TECHNICAL FIELD

This invention relates to the securing of tape leaders to the hubs of reels, and in one aspect to clips for securing leaders to the hubs of videocassette reels.

BACKGROUND ART

Typical of prior art means for attaching tape leaders to reel hubs in videocassettes is an arcuate plastic insert having inturned outwardly barbed ends. The insert snaps into a slot in the plastic rim of the hub, the barbs lying against the inner surface of the rim adjacent to edges of the slot to prevent removal of the insert in a radial direction. After the insert is snapped into place over the leader and into the slot, it is expanded into a tight fit by sliding a metal slug through an opening in the reel flange and between the inturned ends. While the leader is initially firmly secured, loosening may occur subsequently due to relaxation and plastic flow at the hub and insert.

DISCLOSURE OF INVENTION

A fastener according to the present invention avoids the loosening effects of plastic flow and maintains a secure grip on a plastic leader. The security of the grip increases with increased tension applied to the leader, even where the free end of the leader is unsecured. The fastener is easy to apply and lends itself readily to automated assembly procedures.

The new fastener comprises a spring clip with a flat or slightly curved central portion and inturned outwardly curled end portions, which clip is fitted into a slot in a hub rim, with one end portion exerting a camming and holding action against the leader while the other provides a locking or retaining function for the spring clip.

According to the present invention there is provided a tape reel having the slot in its hub rim which slot is defined by two opposing generally parallel edges, the rim having an inner surface adjacent at least one of the edges, and the hub having a support surface spaced from the inner surface; and the clip which is formed from a strip of spring metal. The clip has a "J" shaped end portion including an end part with a distal edge supported against the inner surface of the rim and a curved central part supported against the support surface, a central portion extending between the first and second edges of the rim and being resiliently bent to produce spring tension in the "J" shaped end portion supported against the inner surface and the support surface to hold a leader therebetween, and an end portion opposite the "J" shaped end portion including means for holding the clip in position with its central portion resiliently bent across the slot.

BRIEF DESCRIPTION OF DRAWINGS

The invention will be further explained with reference to the accompanying drawing wherein like numbers refer to like parts in the several views, and wherein.

DETAILED DESCRIPTION

Figure 1:
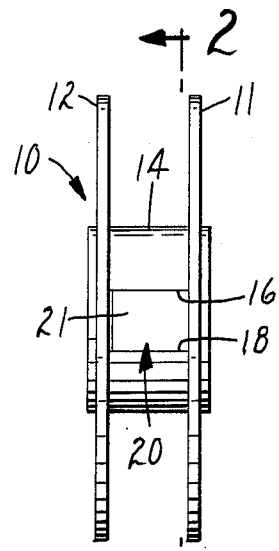
FIG. 1 is a side elevation of a complete reel, including a leader fastener according to the present invention.
Figure 2:
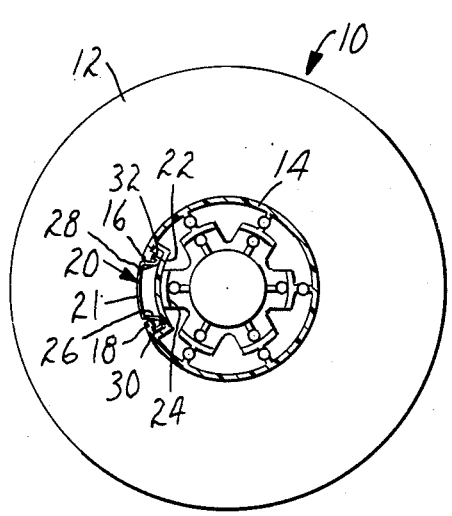
FIG. 2 is a sectional view taken approximately along Lines 2—2 of FIG. 1.

Referring now to the drawing, there is illustrated a reel 10 including a leader fastener according to the present invention. The reel 10 (FIG. 1) comprises two circular flanges 11,12 separated by a central hub including a rim 14 having an opening or slot defined by spaced parallel edges 16 and 18 on the rim 14, within which slot is located a metal spring clip 20. The clip 20 is seen in FIGS. 2 and 3 to have a central portion 21 that provides a continuation of the cylindrical rim 14 across the slot.

Figure 3:
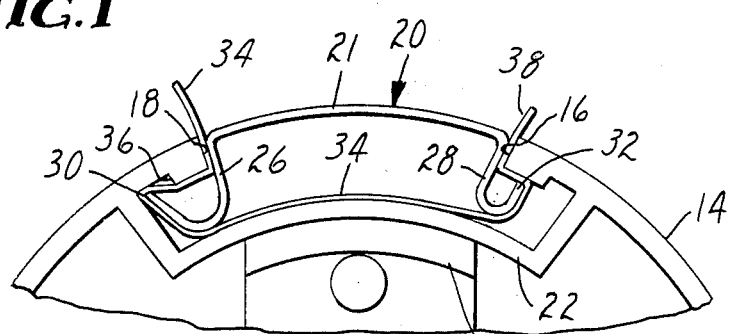
FIG. 3 is an enlarged fragmentary view of the leader fastener showing a leader fastened in place.
Figure 4:
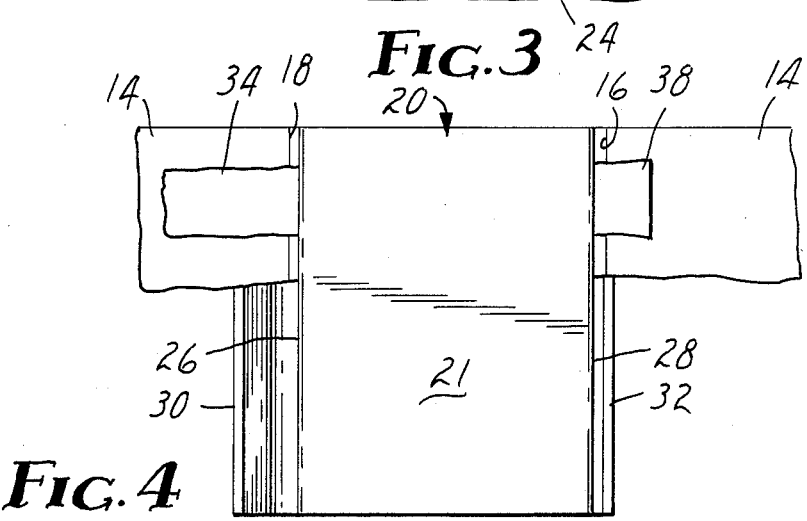
FIG. 4 is a top view of the structure of FIG. 3 with parts broken away to show details.

As is most clearly seen in FIG. 3, the rim 14 is thickened adjacent the edges 16,18 to define identical stepped inner surfaces for the rim 14 adjacent the edges 16,18. A shelf 22 extends beneath the stepped inner surfaces and across the rim opening, and is supported on a pedestal 24 for additional rigidity. The clip 20 has inwardly folded end portions 26 and 28 adjacent the edges 16,18 with distal end parts 30 and 32 that are curved outwardly to provide a larger diameter "J"-shape for the end portion 26 and a smaller diameter and shallower "reverse J"-shape for the end portion 28. The curved bottom central part of the "J"-shaped portion 26 extends to and is supported against the surface of the shelf 22, which provides a support means or surface spaced from the stepped inner surface for the "J"-shaped portion 26, and its distal end part 30 reaches to and is supported against the adjacent inner surface of the rim 14. The "reverse J"-shaped portion 28 does not extend to the shelf 22; its distal and part 32 hooks beneath the thickened rim 14 adjacent the edge 16. A thin plastic leader 34 is shown between the spring clip 20 and the surrounding hub structure.

The central portion 21 of the clip 20 is normally flat or only slightly arcuate. During installation the end part 30 is pressed against the leader 34 to force it beneath the rim 14 adjacent the edge 18. The clip 20 is then rotated and sprung into the position shown, and locked in place by forcing the end part 32 past and beneath the rim 14 adjacent the edge 16. The rotation forces the curved portion of the "J"-shaped portion 26 tightly against the leader 34 to press it against the shelf 22, and the transverse distal edge of the end part 30 against the leader 34 to press it against the stepped inner surface of the rim 14.

The dimensions of the parts (including particularly the spacing between the inner surface of the rim 14 and the shelf 22) are such that a slight deformation occurs as the clip 20 is rotated and locked in place. The end part 30 is forced outwardly along the stepped inner surface of the rim 14, producing spring tension within the "J"-shaped portion 26. The tension is retained by the pressure of the bent spring clip 20. Also, the end part 30 is disposed at a radially outwardly opening acute angle with respect to a radius to the hub extending through the parts of the "J"-shaped portion adjacent the shelf 22 and on the side of that radius opposite the central portion 21 of the clip 20. Thus, any tension applied to the leader 34 causes the distal edge on the end part 30 to press more tightly against the leader 34 and towards the inner surface of the rim 14 and an inner edge 36 along the stepped inner surface, which rim edge 36 is adjacent, parallel to and opposite the edge 18. As a consequence the leader 34 remains firmly anchored.

In the drawing the leader 34 is illustrated as extending beyond the clip 20 at both ends. For rapid mechanical assembly this offers an advantage in not requiring careful placement of the leader 34 prior to inserting the clip 20. Equally effective leader 34 anchorage is attained, however, if the leader 34 does not extend to or around the "reverse J" end portion 28; in which case the undesirable effects produced by a leader end 38 of the leader 34 on subsequent wrappings of magnetic tape are avoided.

The major components of the reel are of plastic whereas the clip 20 is formed from a strip of spring metal such as beryllium copper, phorphor bronze, or stainless steel. The spring reserve maintained in the positioned clip 20 assures permanent retention of the leader 34 despite any slight displacement of reel components due to plastic flow or deformation. Withdrawal tension applied to the leader 34 serves to draw the end part 30 of the clip 20 more tightly against the leader 34 and against the inner edge 36 along the stepped inner surface of the rim 14 for increased holding power. Yet the clip 20 and leader 34 are easily removed by springing the "reverse J"-shaped portion 32 of the clip 20 from beneath the rim 14 at the edge 16. The rim 14 has the same stepped inner surface shape adjacent each of the edges 16 and 18 so that the clip 20 can be reversed and the "J"-shaped portion 26 can be engaged with the rim 14 adjacent the edge 18 and the "reverse J"-shaped portion can be engaged with the rim adjacent the edge 16.

I claim:

1. A tape reel comprising a hub including a rim having a slot defined by two opposing first and second edges on said rim and having an internally thickened section adjacent said first edge to provide with an adjacent portion of said rim a stepped inner surface for said rim, and a supporting shelf spaced beneath said stepped inner surface; and a clip formed from a strip of spring metal sprung within and across said slot, said clip having a "J" shaped end portion including an end part with a distal edge supported against said stepped inner surface at a position spaced from said thickened section and a curved central part supported against said shelf, a central portion extending between said first and second edges and being resiliently bent to produce spring tension in the "J" shaped end portion supported against said stepped inner surface and said support shelf, and a "reverse J" shaped end portion at the end of said central portion opposite said "J" shaped end portion, said "reverse J" end portion being spaced from said shelf and hooked beneath said rim adjacent said second edge to hold said clip in position and retain the resilient bend in said central portion.

2. A reel according to claim 1 wherein a tape leader is held between the "J" shaped end portion of said clamp and said stepped inner surface and said shelf.

3. A tape reel having: a hub including
   a rim having a slot defined by two opposing parallel edges on said rim, said rim having an inner surface adjacent at least one of said edges; and
   a support surface spaced beneath said inner surface; and a clip formed from a strip of spring metal, said clip having:
   a "J" shaped end portion including an end part with a distal edge supported against said inner surface of said rim and a curved central part supported against said suport surface;
   a central portion attached to the end of said "J" shaped end portion opposite said end part and extending between said first and second edges, said end part of the "J" shaped end portion being disposed at a radially outwardly opening acute angle with respect to a radius to the hub extending through the central part of the "J" shaped end portion supported against said support surface, which angle is on the side of said radius opposite said central portion of the clip and said central portion being resiliently bent to produce spring tension in the "J" shaped end portion to bias the distal edge of said end part against said inner surface and said central part against said support surface; and
   an opposite end portion engaged with said hub and providing means for holding said clip in position with said central portion resiliently bent across said slot.

4. A reel according to claim 3 wherein a tape leader is held between the "J" shaped end portion of said spring clip and said inner surface and said support surface.

5. A tape reel according to claim 3 wherein said rim has an internally thickened section adjacent said one edge so that said inner surface is stepped and has an inner edge along said inner surface parallel to and opposite said one edge; and the distal edge on said end part of said "J" shaped end portion is supported against said inner surface adjacent said inner edge at a position spaced from said thickened portion.

6. A tape reel according to claim 5 wherein said rim has similar internally thickened sections adjacent each of said edges adapted to be engaged by the "J" shaped end portion.

* * * * *